US012703358B2

(12) United States Patent
Olsson et al.

(10) Patent No.: US 12,703,358 B2
(45) Date of Patent: Aug. 11, 2026

(54) METHODS AND SYSTEMS FOR CONTROLLING A VEHICLE HAVING A LANE SUPPORT SYSTEM

(71) Applicant: ZENSEACT AB, Gothenburg (SE)

(72) Inventors: Claes Olsson, Mölnlycke (SE); Andreas Ekenberg, Torslanda (SE); Henrik Eriksson, Hovås (SE)

(73) Assignee: ZENSEACT AB, Gothenburg (SE)

( * ) Notice: Subject to any disclaimer, the term of this patent is extended or adjusted under 35 U.S.C. 154(b) by 76 days.

(21) Appl. No.: 18/396,263

(22) Filed: Dec. 26, 2023

(65) Prior Publication Data

US 2024/0208496 A1 Jun. 27, 2024

(30) Foreign Application Priority Data

Dec. 27, 2022 (EP) .................................... 22216710

(51) Int. Cl.

| | |
|---|---|
| ***B60W 30/12*** | (2020.01) |
| ***B60W 10/20*** | (2006.01) |
| ***B60W 30/14*** | (2006.01) |
| ***B60W 40/08*** | (2012.01) |
| ***B60W 50/14*** | (2020.01) |

(52) U.S. Cl.

CPC ............ *B60W 30/12* (2013.01); *B60W 10/20* (2013.01); *B60W 30/146* (2013.01); *B60W 40/08* (2013.01); *B60W 50/14* (2013.01); *B60W 2040/0818* (2013.01); *B60W 2540/223* (2020.02); *B60W 2540/229* (2020.02); *B60W 2710/202* (2013.01)

(58) Field of Classification Search

CPC .... B60W 30/12; B60W 10/20; B60W 30/146; B60W 40/08; B60W 50/14; B60W 2040/0818; B60W 2540/223; B60W 2540/229; B60W 2710/202; B60W 30/18009; B60W 2050/146

USPC .......................................................... 701/41

See application file for complete search history.

(56) References Cited

U.S. PATENT DOCUMENTS

| | | | |
|---|---|---|---|
| 2016/0107644 | A1 | 4/2016 | Eigel |
| 2016/0121886 | A1 | 5/2016 | Eigel |
| 2017/0232973 | A1 | 8/2017 | Otake |

(Continued)

FOREIGN PATENT DOCUMENTS

| | | | | |
|---|---|---|---|---|
| EP | 1726513 | B1 | | 4/2014 |
| JP | H06274798 | A | * | 9/1994 |
| KR | 101427454 | B1 | | 8/2014 |

OTHER PUBLICATIONS

Extended European Search Report mailed Jun. 13, 2023 for European Application No. 22216710.8, 11 pages.

*Primary Examiner* — Yi-Kai Wang
(74) *Attorney, Agent, or Firm* — Sage Patent Group

(57) ABSTRACT

A computer-implemented method and related aspects for controlling a vehicle having a Lane Support System (LSS) are disclosed. The LSS is configured to automatically intervene by controlling a steering of the vehicle in order to change a heading direction of the vehicle when the vehicle approaches a lane boundary of a lane of travel so that the vehicle does not traverse the lane boundary. The method includes monitoring interventions performed by the LSS, and reducing a speed of the vehicle in response to a fulfilment of a criterion dependent on a number of interventions performed by the LSS exceeding a threshold value within a defined time period.

12 Claims, 7 Drawing Sheets

(56) References Cited

U.S. PATENT DOCUMENTS

| | | | | |
|---|---|---|---|---|
| 2018/0037216 | A1 | 2/2018 | Otake | |
| 2020/0377098 | A1 | 12/2020 | Klink et al. | |
| 2022/0048499 | A1 | 2/2022 | Yang | |
| 2023/0311983 | A1* | 10/2023 | Herman | B62D 15/021 |
| 2024/0149878 | A1* | 5/2024 | Omagari | B60W 40/109 |

* cited by examiner

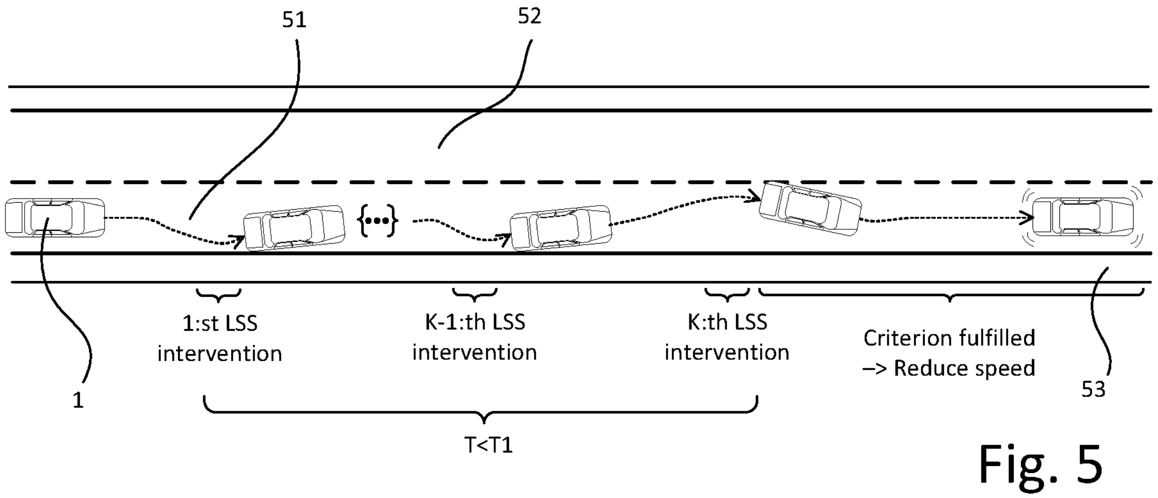

Fig. 5

Output hands-off warning
Output hands-off warning
Output hands-off warning
51
52
1:st LSS intervention while driver-out-of-the-loop detected
L-1:th LSS intervention while driver-out-of-the-loop detected
L:th LSS intervention while driver-out-of-the-loop detected
Criterion fulfilled –> Reduce speed
1
53
T<T2

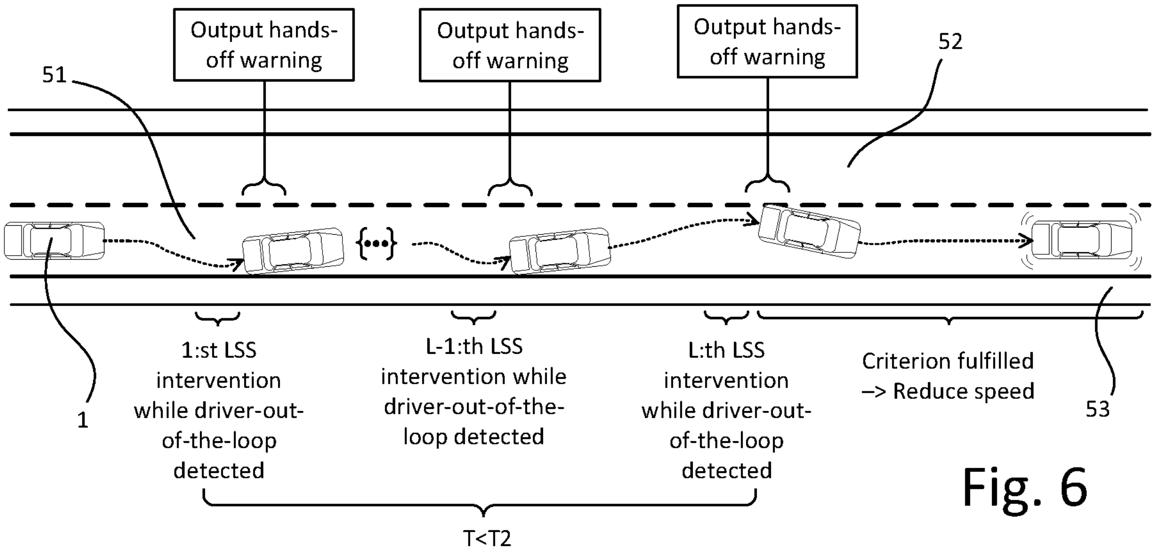

Fig. 6

Output hands-off warning
51
52
1:st LSS intervention while driver-in-the-loop detected
N:th LSS intervention while driver-in-the-loop detected
M:th LSS intervention while driver-out-of-the-loop detected
Criterion fulfilled –> Reduce speed
1
53
T<T4
T<T3

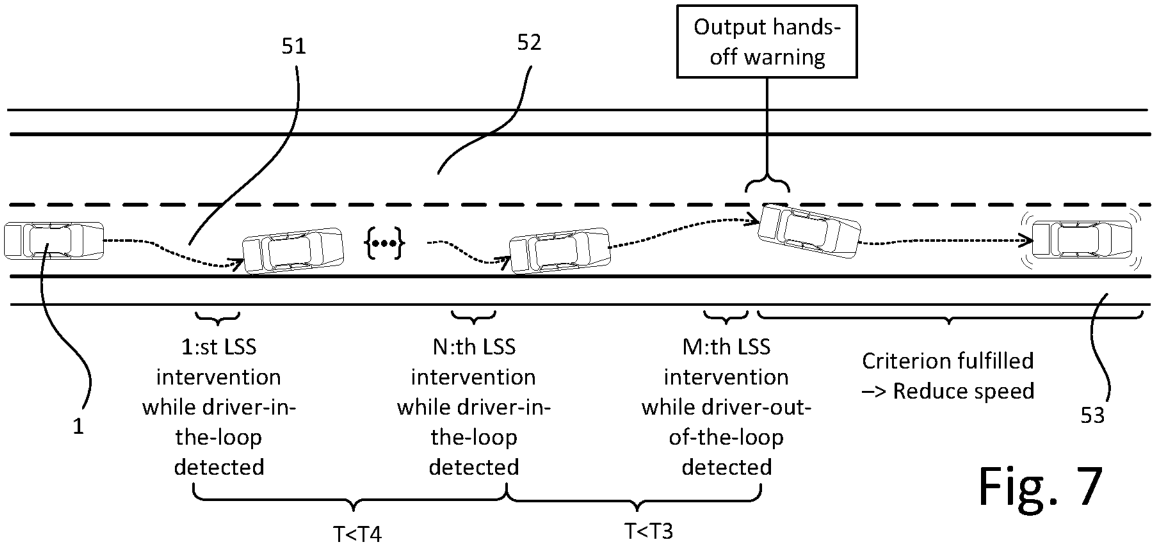

Fig. 7

METHODS AND SYSTEMS FOR CONTROLLING A VEHICLE HAVING A LANE SUPPORT SYSTEM

CROSS-REFERENCE TO RELATED APPLICATIONS

The present application for patent claims priority to European Patent Office Application Ser. No. 22216710.8, entitled "METHODS AND SYSTEMS FOR CONTROLLING A VEHICLE HAVING A LANE SUPPORT SYSTEM" filed on Dec. 27, 2022, assigned to the assignee hereof, and expressly incorporated herein by reference.

TECHNICAL FIELD

The disclosed technology relates to methods apparatuses, and thereto related aspects for controlling a vehicle having a Lane Support System (LSS). In particular, but not exclusively, the disclosed technology relates to risk mitigation upon detection of driver unresponsiveness based on LSS interventions.

BACKGROUND

During the last few years, the research and development activities related to autonomous vehicles have exploded in number, and many different approaches are being explored. An increasing portion of modern vehicles have advanced driver-assistance systems (ADAS) to increase vehicle safety and more generally road safety. ADAS—which for instance may be represented by adaptive cruise control (ACC), collision avoidance systems, forward collision warning systems, etc.—are electronic systems that may aid a vehicle driver while driving. Today, there is ongoing research and development within a number of technical areas associated to both the ADAS and Autonomous Driving (AD) field. For the purpose of the present disclosure, ADAS (may also be referred to as driver support features) and AD (may also be referred to as Automated Driving features) are encompassed under the joint term Automated Driving System (ADS). Thus, "ADS" as used herein may comprise one or more features or functions of any level 0-5 of driving automation according to SAE J3016 levels of driving automation for on-road vehicles. However, as readily understood, the SAE J3016 levels of driving automation, is merely one example of a standard-like definition for ADS as used herein, and may, in general, be understood as any software and/or hardware feature of a vehicle that is configured to partially or fully execute a driving task.

However, even with the ongoing rapid developments in the field, the road to full automation where the driver is allowed to completely disengage from the driving task and allow the vehicle to handle any driving task is long. Therefore, for the time being, the driver still forms a crucial part for safely executing various driving tasks, either directly or indirectly (e.g. through monitoring of the surrounding environment and staying alert). In other words, many of the ADS features currently on the market and ADS features that are currently being developed, still rely on the driver being responsive to be able to assume responsibility of the driving task should it be needed.

Therefore, there is a need in the art for new and improved solutions for estimating a state of the driver and in particular for estimating if the driver is responsive or unresponsive (e.g. due to excessive fatigue or sudden health problems) in order to reduce the risk of accidents caused by driver incapacitation.

SUMMARY

Some embodiments of the herein disclosed technology seek to mitigate, alleviate or eliminate one or more of the deficiencies and disadvantages in the prior art to address various problems relating to risk mitigation in situations where the driver is incapacitated or otherwise incapable of carrying out driving functions for which he or she is responsible.

Various aspects and embodiments of the disclosed invention are defined below and in the accompanying independent and dependent claims.

A first aspect of the disclosed technology comprises a computer-implemented method for controlling a vehicle having a Lane Support System (LSS) configured to automatically intervene by controlling a steering of the vehicle in order to change a heading direction of the vehicle when the vehicle approaches a lane boundary of a lane of travel so that the vehicle does not traverse the lane boundary. The method comprises monitoring interventions performed by the LSS. The method further comprises reducing a speed of the vehicle in response to a fulfilment of a criterion dependent on a number of interventions performed by the LSS exceeding a threshold value within a defined time period.

A second aspect of the disclosed technology comprises a computer program product comprising instructions which, when the program is executed by a computing device of a vehicle, causes the computing device to carry out the method according to any one of the embodiments disclosed herein. With this aspect of the disclosed technology, similar advantages and preferred features are present as in the other aspects.

A third aspect of the disclosed technology comprises a (non-transitory) computer-readable storage medium comprising instructions which, when executed by a computing device of a vehicle, causes the computing device to carry out the method according to any one of the embodiments disclosed herein. With this aspect of the disclosed technology, similar advantages and preferred features are present as in the other aspects.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

A fourth aspect of the disclosed technology comprises an apparatus for controlling a vehicle having a Lane Support System (LSS) configured to automatically intervene by controlling a steering of the vehicle in order to change a heading direction of the vehicle when the vehicle approaches a lane boundary of a lane of travel so that the vehicle does not traverse the lane boundary. The apparatus comprises control circuitry in communicative connection with the LSS, and the control circuitry is configured to monitor interventions performed by the LSS. The control circuitry is further configured to reduce a speed of the vehicle in response to a fulfilment of a criterion dependent on a number of interventions performed by the LSS exceeding a threshold value within a defined time period. With this aspect of the disclosed technology, similar advantages and preferred features are present as in the other aspects.

A fifth aspect of the disclosed technology comprises a vehicle comprising a Lane Support System (LSS) configured to automatically intervene by controlling a steering of the vehicle in order to change a heading direction of the vehicle when the vehicle approaches a lane boundary of a lane of travel so that the vehicle does not traverse the lane boundary. The vehicle further comprises an apparatus according to any one of the embodiments disclosed herein. With this aspect of the disclosed technology, similar advantages and preferred features are present as in the other aspects.

The disclosed aspects and preferred embodiments may be suitably combined with each other in any manner apparent to anyone of ordinary skill in the art, such that one or more features or embodiments disclosed in relation to one aspect may also be considered to be disclosed in relation to another aspect or embodiment of another aspect.

An advantage of some embodiments is a cost-effective and robust solution for detecting an unresponsive driver is provided, whereupon appropriate safety measured may be taken so to reduce the risk of harm to the occupants of the vehicle and other road users.

An advantage of some embodiments is that the risk of lane-drift crashes due to incapacitation of a driver may be reduced.

Further embodiments are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the disclosed technology will in the following be further clarified with reference to the embodiments described hereinafter.

BRIEF DESCRIPTION OF THE DRAWINGS

The above aspects, features and advantages of the disclosed technology, will be more fully appreciated by reference to the following illustrative and non-limiting detailed description of example embodiments of the present disclosure, when taken in conjunction with the accompanying drawings, in which:

FIGS. 5-9 are schematic top-view illustrations of a vehicle comprising a Lane Support System (LSS) and an apparatus for controlling the vehicle in accordance with some embodiments.

DETAILED DESCRIPTION

Figure 1:
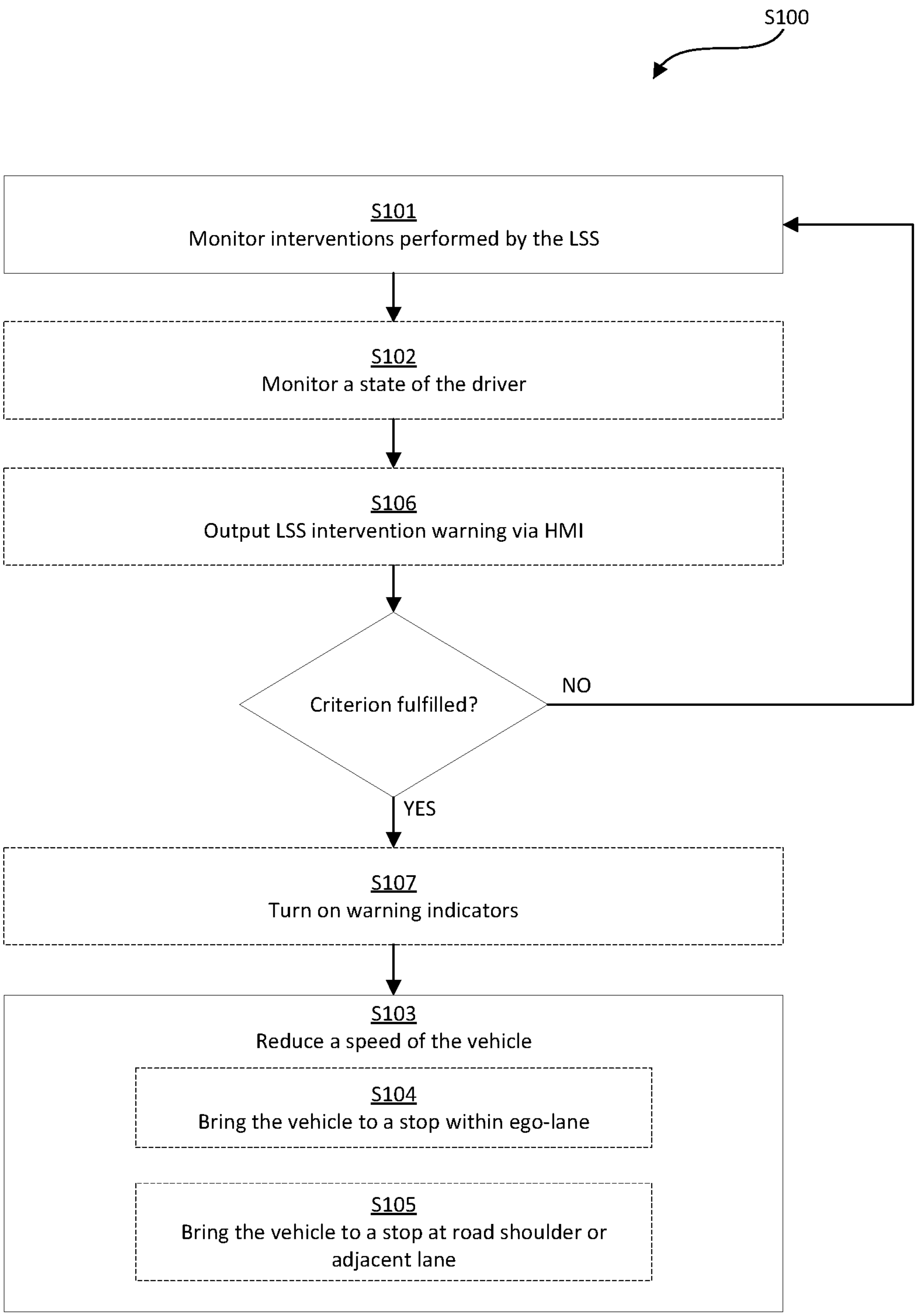
FIG. 1 is a schematic flowchart representation of a method for controlling a vehicle having a Lane Support System (LSS) in accordance with some embodiments.

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs), using one or more Field Programmable Gate Arrays (FPGA) and/or using one or more Digital Signal Processors (DSPs).

It will also be appreciated that when the present disclosure is described in terms of a method, it may also be embodied in apparatus comprising one or more processors, one or more memories coupled to the one or more processors, where computer code is loaded to implement the method. For example, the one or more memories may store one or more computer programs that causes the apparatus to perform the steps, services and functions disclosed herein when executed by the one or more processors in some embodiments.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative.

It will also be understood that, although the term first, second, etc. may be used herein to describe various elements or features, these elements should not be limited by these terms. These terms are only used to distinguish one element from another. For example, a first signal could be termed a second signal, and, similarly, a second signal could be termed a first signal, without departing from the scope of the invention. The first signal and the second signal are both signals, but they are not the same signal.

As used herein, the term "if" may be construed to mean "when or "upon" or "in response to" or depending on the context. Similarly, the phrase "if it is determined' or "when it is determined" or "in an instance of" may be construed to mean "upon determining or "in response to determining" or "upon detecting and identifying occurrence of an event" or "in response to detecting occurrence of an event" depending on the context.

Steering support functions or features for preventing unintended lane departures when the vehicle is driven in "manual mode" (i.e. at least some of the steering responsibility resides with the driver) has been around for more than a decade. This is usually referred to as a "Lane Support System" (LSS). In the context of the present disclosure, the term LSS is considered to encompass both Lane Keep Assist/Aid (LKA) and Emergency Lane Keeping. In other words, in the context of the present disclosure, LSS may be understood as an ADS feature that is configured to automatically intervene by controlling at least a steering of the vehicle in order to change a heading direction of the vehicle when the vehicle approaches a lane boundary of a lane of travel so that the vehicle does not traverse the lane boundary. In some embodiments, the LSS is configured to apply an overlay steer torque to the steering system of the vehicle in order to change a heading direction of the vehicle with respect to the lane boundary (e.g. as defined by lane markers) when the vehicle is about to depart from the lane (e.g. cross the lane markers).

An unintended drift towards either side of a lane is oftentimes caused by a temporary distraction, however, in some situations it may be caused by excessive fatigue causing the driver to fall asleep or, it could also be due to a more severe driver condition caused by the onset of sudden sickness (such as e.g., a heart attack, stroke, unconsciousness, etc.). Under these conditions, an LSS has the potential to reduce the risk of injury for any occupants of the vehicle as well as for other road users by preventing the vehicle from drifting out of the lane.

However, if the driver is being unresponsive and therefore not able to take back control of the vehicle, the vehicle equipped with an LSS will keep bouncing against the lane boundaries defined by the lane markers in a way that is mainly dependent of the road banking and road curvature. Moreover, since all Lane Support Systems (LSSs) are likely to have some performance limitation, there is a risk that the vehicle eventually will leave the road or collide with some object in adjacent lane, if the driver does not come back in-the-loop. Therefore, some embodiments herein aim to reduce the safety risks associated with the driver falling out-of-the-loop when driving a car in manual mode.

For example, if the driver is vigilant and attentive, the vehicle should not be bouncing repeatedly off a lane boundary or between the lane boundaries, when the vehicle is operated in a "manual mode". A vehicle being operated in a "manual mode" is in the present context to be understood as that at least the steering responsibility to maintain the vehicle within a lane of travel resides with the driver.

Once in a while, a driver might accidentally drift towards adjacent lane, for instance due to temporary distraction, but a vigilant and attentive driver shall never get repeated LSS interventions during a relatively short time period. Thus, if repeated LSS interventions still occur, in particular, when they occur consecutively or repeatedly during a limited time period, it may for example be due to severe unforeseeable misuse of the LSS, or that the driver is in some way incapacitated and therefore unable to stay away from the lane boundaries. Moreover, if the driver does not apply any steering during LSS interventions and or otherwise does not respond to any "driver-out-of-the-loop warnings" (may also be referred to as "hands-off warnings"); this can be used as an indicator that the driver is no longer able to carry out the driving task and has fallen out-of-the-loop.

Therefore, some embodiments herein provide for an efficient and robust means for identifying such situations and to carry out a minimum risk manoeuvre (MRM), so that the vehicle may, for example, be brought to a stop at a safe location (potentially while trying to get the driver back in-the-loop). Thus, an advantage of some embodiments is that safety risks associated with a stray vehicle (incapacitated/unresponsive driver) may be reduced or mitigated.

Even though the present disclosure may focus on "manual mode" operation, some embodiments herein are applicable for automated operation of the vehicle, where the teachings herein are applicable to detect software and or hardware errors causing the ADS to repeatedly trigger LSS interventions, and to consequently reduce the risk of accidents caused by such errors.

FIG. 1 is a schematic flowchart of a method S100 for controlling a vehicle having a Lane Support System (LSS), which is configured to automatically intervene by controlling a steering of the vehicle in order to change a heading direction of the vehicle when the vehicle approaches a lane boundary of a lane of travel so that the vehicle does not traverse the lane boundary. The method S100 is preferably a computer-implemented method S100, performed by a processing system of the vehicle. The processing system may for example comprise one or more processors and one or more memories coupled to the one or more processors, wherein the one or more memories store one or more programs that perform the steps, services and functions of the method S100 disclosed herein when executed by the one or more processors.

The method S100 may be implemented as a function or sub-routine of the LSS architecture, or it may be a function or feature separate from the LSS architecture. For example, the method S100 may be implemented as a part of a safety function or risk mitigation function of an ADS platform. As mentioned in the foregoing, a "Lane Support System" (LSS) may also be known as a Lane Keep Aid (LKA), Lane Keeping Assistance (LKA), Lane Keep Assistance (LKA), Emergency Lane Keeping (ELK), and so forth. In some embodiments, the LSS is configured to automatically intervene by applying an overlay steer torque to a steering system of the vehicle when the vehicle approaches the lane boundary of the lane of travel (also known as "ego-lane") so that the vehicle does not traverse the lane boundary. A lane boundary may for example be defined by lane markers extending along a travel direction of a lane.

The method S100 comprises monitoring S101 interventions performed by the LSS. In particular, the monitoring S101 may comprise counting a number of interventions performed by the LSS. Thus, the term "monitoring" is in the present context to be construed broadly, and may be understood as observing, checking, or keeping a (continuous) record of something. Thus, the monitoring S101 of the interventions performed by the LSS may comprise obtaining an indication of an intervention performed by the LSS. The indication may be received from the LSS or any other function, unit or system configured to monitor the interventions performed by the LSS. However, as mentioned the method S100 may be implemented as a function or subroutine of the LSS architecture, wherefore the LSS may be configured to update a data record every time an intervention is performed. The data record may be in the form of a counter. Moreover, the counter may be updated periodically so to remove entries that are older than some predefined value (e.g. older than 30 seconds, 60 seconds, 5 minutes, 10 minutes, etc.).

The term "obtaining" is herein to be interpreted broadly and encompasses receiving, retrieving, collecting, acquiring, and so forth directly and/or indirectly between two entities configured to be in communication with each other or further with other external entities. However, in some embodiments, the term "obtaining" is to be construed as determining, deriving, forming, computing, etc. In other words, obtaining an indication of an LSS intervention may encompass determining that an intervention has been performed by the LSS of the vehicle based on e.g. data transmitted from the LSS. Thus, as used herein, "obtaining" may indicate that a parameter is received at a first entity/unit from a second entity/unit, or that the parameter is determined at the first entity/unit e.g. based on data received from another entity/unit.

Further, in response to a fulfilment of a criterion dependent on a number of interventions performed by the LSS exceeding a threshold value within a defined time period, the method S100 comprises reducing S103 a speed of the vehicle. In some embodiments, the reducing S103 the speed of the vehicle comprises reducing the speed of the vehicle to zero. In other words, the reducing S103 of the speed of the vehicle may comprise bringing the vehicle to a stand-still. In some embodiments, the criterion comprises that a number of interventions performed by the LSS exceeds the threshold value during the defined time period. In other words, in some embodiments, in order for the criterion to be fulfilled, the number of interventions performed by the LSS should exceed the threshold value during the defined time period. In some embodiments, the term "time period" may be understood as the last Z seconds, where Z is a value in the range of 10 seconds to 600 seconds. Thus, in order for the criterion to be fulfilled, the number of interventions performed by the LSS should exceed the threshold value during the last Z seconds.

In some embodiments, the method further comprises turning S107 on warning indicators of the vehicle in response to the fulfilment of the criterion. Moreover, in some embodiments, the method S100 further comprises steering the vehicle to a centre of the lane of travel in response to the fulfilment of the criterion. Accordingly, in response to the fulfilment of the criterion, the method S100 may comprise bringing S104 the vehicle to stop within the lane of travel (may also be referred to as "ego lane"). In particular, the vehicle may be brought S104 to a stop at a centre of the lane of travel in response to the fulfilment of the criterion.

However, in some embodiments, the method S100 further comprises steering the vehicle to a road shoulder adjacent to the lane of travel or a lane adjacent to the lane of travel in response to the fulfilment of the criterion. In other words, the vehicle may be brought S105 to a stop at a road shoulder or an adjacent lane in response to the fulfilment of the criterion.

Further, in some embodiments, the method S100 comprises outputting S106 one or more warnings to the driver, via one or more Human-Machine-Interfaces (HMIs) of the vehicle, in response to an intervention being performed by the LSS. In the context of the present disclosure, an HMI may be understood as a communication bridge between the driver and the vehicle itself or the outside world. Examples of HMIs are instrument clusters, centre consoles/infotainment systems, heads-up displays, etc. The warning output S106 may be visual output, audio output, and/or tactile output directed towards one or more occupants of the vehicle.

Figure 2:
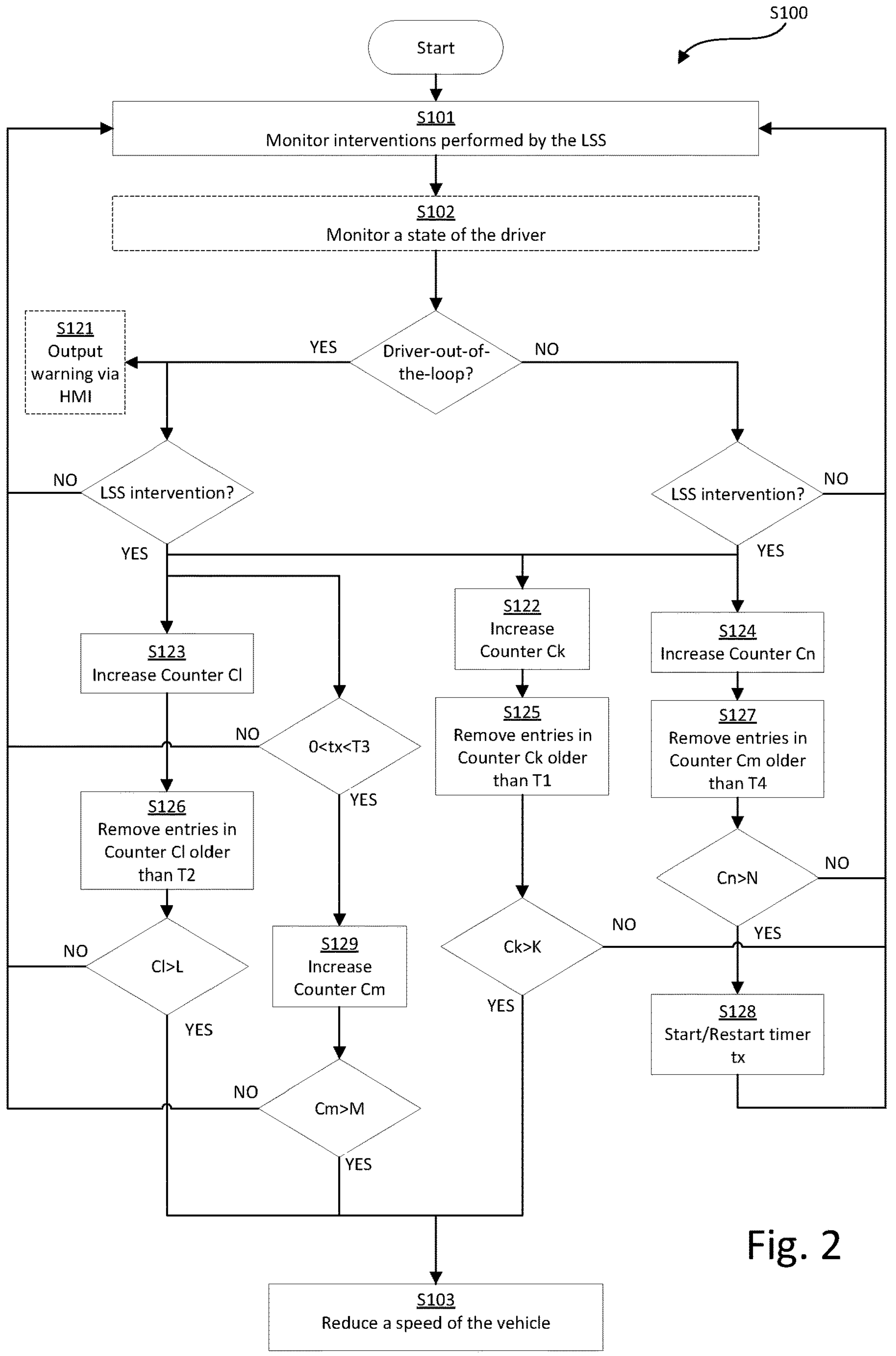
FIG. 2 is a schematic flowchart representation of a method for controlling a vehicle having a Lane Support System (LSS) in accordance with some embodiments.
Figure 3:
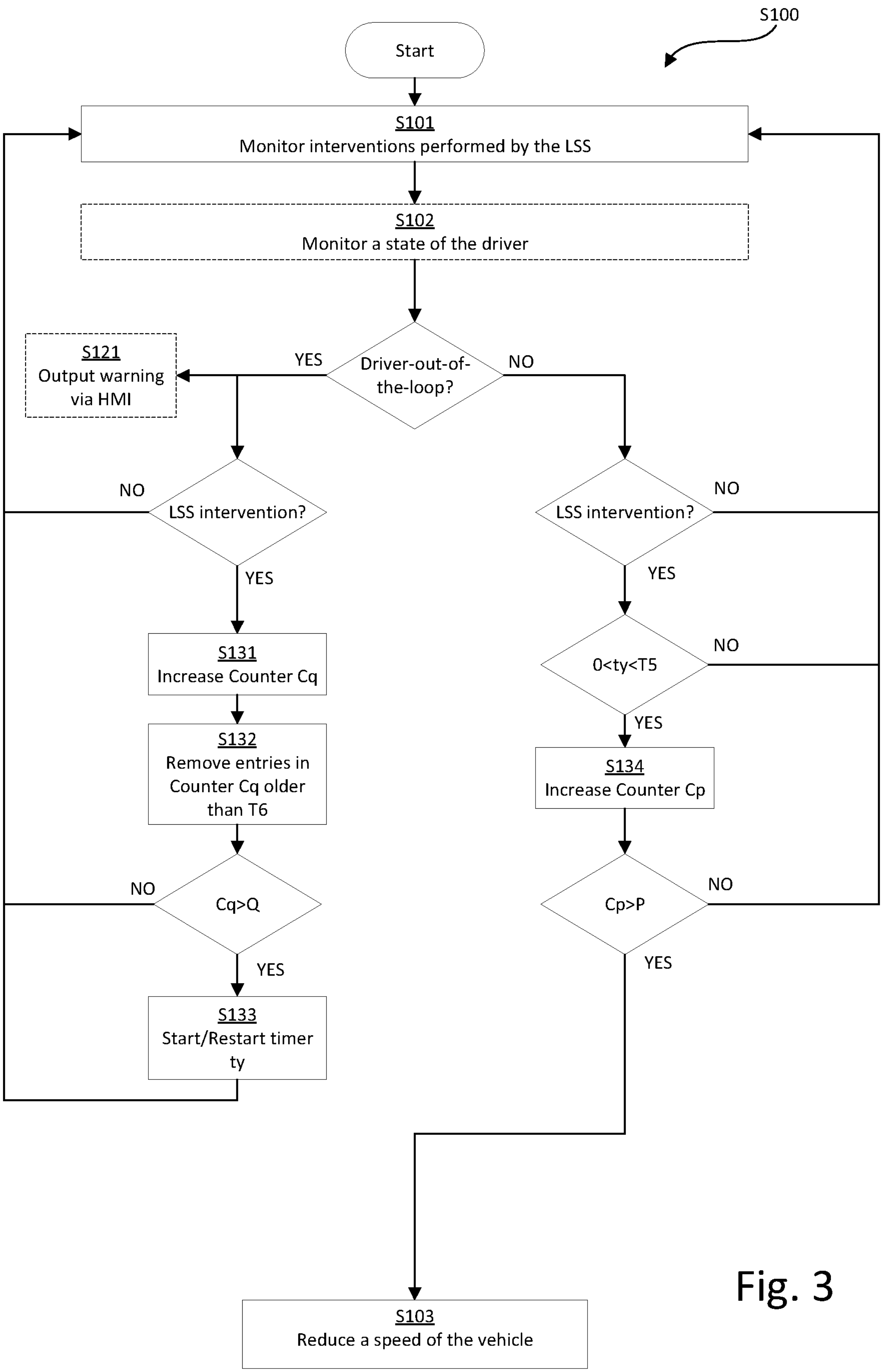
FIG. 3 is a schematic flowchart representation of a method for controlling a vehicle having a Lane Support System (LSS) in accordance with some embodiments.
Figure 4:
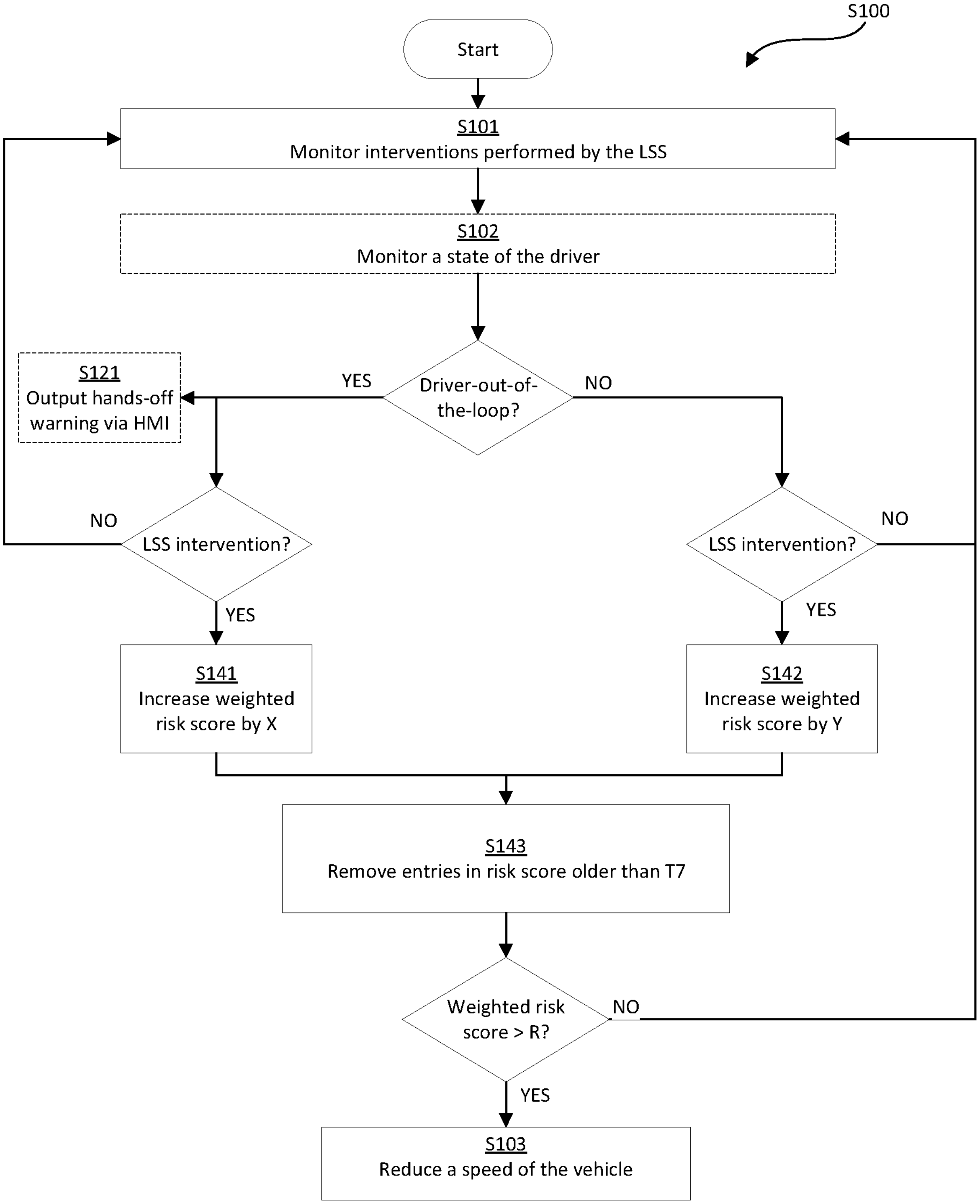
FIG. 4 is a schematic flowchart representation of a method for controlling a vehicle having a Lane Support System (LSS) in accordance with some embodiments.

Moving on to FIGS. 2-4, which are schematic flowchart representations of a method S100 for controlling a vehicle having an LSS in accordance with some embodiments. In particular, FIGS. 2-4 illustrate some example implementations of how the fulfilment of the criterion may be checked in accordance with some embodiments. In other words, the schematic flow chart representations depicted in FIGS. 2-4 provide further details related to the criterion dependent on the number of interventions performed by the LSS exceeding a threshold value within a defined time period. Moreover, FIGS. 2-4 provide specific details of how the computer-implemented method S100 may be implemented using programmatic logic in accordance with some embodiments. As will be described in the following, the criterion may be one out of a plurality of criteria, whereupon a fulfilment of one (single) criterion of the plurality of criteria causes the speed of the vehicle to be reduced S103.

In some embodiments, the method S100 further comprises monitoring S102 a state of a driver of the vehicle, where the state of the driver comprises a driver-in-the-loop state (may also be referred to as a "hands-on" state) and a driver-out-of-the-loop state (may also be referred to as a "hands-off" state). In some embodiments, the driver-in-the-loop state comprises a state where the driver is touching the steering wheel of the vehicle and/or where the driver applies a torque on the steering wheel of the vehicle. Furthermore, in some embodiments, wherein the driver-out-of-the-loop state is a state where the driver is not touching the steering wheel of the vehicle and/or where the driver is not applying any torque on the steering wheel of the vehicle. The monitoring S102 of the state of the driver may be a function or sub-routine of the LSS, or some other system such as e.g. a Driver Monitoring System (DMS).

The monitoring S102 of the driver state may comprise receiving a signal from one or more capacitive sensors arranged in a steering wheel of the vehicle. The capacitive sensors are accordingly configured to detect if an occupant of the vehicle is touching the steering wheel. However, as an addition or alternative, the monitoring S102 of the driver state may comprise receiving a signal from one or more sensors configured to sense if the driver has applied a torque on the steering wheel. In more detail, the monitoring S102 of the driver state may comprise receiving a signal from one or more steering angle sensors and/or from one or more steering torque sensors. Steering angle sensors and/or steering torque sensors are generally included as a part of an electric power steering system of any conventional modern vehicle, wherefore the functions and details related thereto are considered to be readily known by the person skilled in the art, and will for the sake of brevity and conciseness not be further elaborated upon.

In some embodiments, the monitoring S102 of the state of the driver may comprise receiving a signal from a DMS of the vehicle. In general, a DMS may be understood as a system comprising one or more cameras focused on a driver of the vehicle in order to capture images of the driver's face and body so to determine various facial and other characteristics of the driver including the position, orientation, and movement of the driver's eyes, face, head, and hands.

In some embodiments, the method S100 further comprises outputting S121 one or more warnings to the driver, via one or more Human-Machine-Interfaces (HMIs) of the vehicle, in response to a detection of the state of the driver being the driver-out-of-the-loop state. In other words, the driver is warned when he or she is considered to be inattentive or otherwise not considered to be assuming the responsibility for the driving task, for example, based on sensor data indicating that the driver is not touching the steering wheel.

As mentioned, the criterion may be one out of a plurality of criteria, and the method S100 may comprise reducing S103 a speed of the vehicle in response to a fulfilment of one criterion out of the plurality of criteria. Thus, in accordance with some embodiments, one criterion out of the plurality of criteria comprises that a number of interventions performed by the LSS exceeds a first threshold (K) during a first time period (T1). As illustrated in FIG. 5, regardless of the driver being determined to be "in-the-loop" or "out-of-the-loop", if the number of LSS interventions exceeds a value (K) over the course of a time period shorter than a first time period (T1), the driver is concluded to be unresponsive or otherwise incapacitated and unable to perform the required driving tasks. Therefore, in response to the criterion being fulfilled, the speed of the vehicle 1 is reduced. In some embodiments, the vehicle 1 is brought to standstill and warning indicators (or hazard lights) may be activated during the deceleration and kept on after the vehicle has stopped so to alert other road users. Furthermore, an automated procedure for contacting emergency services may be initiated by the vehicle 1. The vehicle 1 may be brought to standstill within the lane of travel 51, in an adjacent lane 52, or at a road shoulder 53 adjacent to the lane of travel 51.

Turning to FIG. 2, in some embodiments, the method S100 comprises monitoring S101 interventions performed by the LSS and monitoring S102 a state of the driver. In response to the state of the driver being a "driver-out-of-the-loop" state (e.g. a "hands-off" state), a "hands-off" warning may be output S121 via an HMI of the vehicle. Further, if an LSS intervention is detected (regardless of the state of the driver), a first counter (Ck) is increased S122 by one. Further, the method S100 may comprise removing S125 any entries in the first counter (Ck) that are older than the first time period (T1), and a check may be performed to see if the value of the first counter (Ck) is greater than the first threshold (K). In more detail, if the first time period (T1) is e.g. Tx seconds, the step of removing S125 any entries comprises removing any entries in the first counter (Ck) that are older than Tx seconds. Further, in response to the first counter value (Ck) being greater than the first threshold (K), the method S100 may comprise reducing S103 a speed of the vehicle.

As before, the method S100 may further comprise outputting S106 a warning to the driver of the vehicle, via an HMI of the vehicle, in response to an LSS intervention being performed. The first time period (T1) may be a value within the range of 10 to 600 seconds, such as e.g. 30 seconds, 60 seconds, 90 seconds, 120 seconds, 240 seconds, 300 seconds, and so forth. The first threshold value (K) may be a positive integer in the range of 2-10, such as e.g. 3, 5, 7, or 8. As readily understood by the skilled artisan, the above-examples are not to be construed as limiting to the present disclosure, and the values T1 and K may be set according to a predefined standard or a predefined regulation as defined by a governing authority. The governing authority may be an authority tasked with defining safety regulations for ADS functions or features.

In some embodiments, one criterion out of the plurality of criteria comprises that a number of interventions performed by the LSS, while the driver-out-of-the-loop state is detected, exceeds a second threshold (L) within a second time period (T2). As illustrated in FIG. 6, the LSS performs L (consecutive) interventions while the driver is determined to be "out-of-the-loop", and optionally, determined to be unresponsive to the warnings outputted via the HMI of the vehicle 1. Then, in response to the number of "out-of-the-loop" interventions exceeding the second threshold (L) within the second time period (T2), the speed of the vehicle 1 is reduced. In some embodiments, the vehicle 1 is brought to standstill and warning indicators (or hazard lights) may be activated during the deceleration and kept on after the vehicle has stopped so to alert other road users. Furthermore, an automated procedure for contacting emergency services may be initiated by the vehicle 1. The vehicle 1 may be brought to standstill within the lane of travel 51, in an adjacent lane 52, or at a road shoulder 53 adjacent to the lane of travel 51.

Turning to FIG. 2, in some embodiments, the method S100 comprises monitoring S101 interventions performed by the LSS and monitoring S102 a state of the driver. In response to the state of the driver being a "driver-out-of-the-loop" state (e.g. a "hands-off" state), a "hands-off" warning may be output S121 via an HMI of the vehicle. Further, if an LSS intervention is detected, while the driver is "out-of-the-loop" a second counter (Cl) is increased S123 by one. Further, the method S100 may comprise removing S126 any entries in the second counter (Cl) that are older than the second time period (T2), and a check may be performed to see if the value of the second counter (Cl) is greater than the second threshold (L). In more detail, if the second time period (T2) is e.g. Tx seconds, the step of removing S126 any entries comprises removing any entries in the second counter (Cl) that are older than Tx seconds. Further, in response to the second counter value (Cl) being greater than the second threshold (L), the method S100 may comprise reducing S103 a speed of the vehicle.

As before, the method S100 may further comprise outputting S106 a warning to the driver of the vehicle, via an HMI of the vehicle, in response to an LSS intervention being performed. The second time period (T2) may be a value within the range of 10 to 600 seconds, such as e.g. 30 seconds, 60 seconds, 90 seconds, 120 seconds, 240 seconds, 300 seconds, and so forth. The second threshold value (L) may be a positive integer in the range of 2-10, such as e.g. 3, 5, 7, or 8. As readily understood by the skilled artisan, the above-examples are not to be construed as limiting to the present disclosure, and the values T2 and L may be set according to a predefined standard or a predefined regulation as defined by a governing authority. The governing authority may be an authority tasked with defining safety regulations for ADS functions or features.

In some embodiments, the second time period (T2) is shorter than the first time period (T1). In some embodiments, the second threshold (L) is smaller than the first threshold (K). Since LSS interventions performed while the driver is "out-of-the-loop" may be more critical than LSS interventions performed while the driver is "in-the-loop" it may be advantageous to have a faster trigger for reducing S103 the speed of the vehicle in such cases. This is because consecutive LSS interventions performed while the driver is "out-of-the-loop" may be indicative of that the driver is incapacitated (e.g. passed out) wherefore a faster trigger to bring the vehicle to a "safe state" (e.g. standstill) may be beneficial in order to reduce any risks to the occupants of the vehicle as well as to other road users.

In some embodiments, one criterion out of the plurality of criteria comprises that a number of interventions performed by the LSS, while the driver-out-of-the-loop state is detected, exceeds a third threshold (M) within a third time period (T3). Here, the third time period (T3) immediately follows an exceedance of a fourth threshold (N) of a number of interventions performed by the LSS, while the driver-in-the-loop state is detected, within a fourth time period (T4). As illustrated in FIG. 7, the LSS performs N interventions while the driver is determined to be "in-the-loop" (e.g. the driver's hands are detected to be touching the steering wheel) during the fourth time period (T4). Then, after the N:th "driver-in-the-loop" LSS intervention, the LSS performs M consecutive interventions while the driver is determined to be "out-of-the-loop" (e.g. not touching the steering wheel) over the course of a third time period (T3), which fulfils the criterion and the speed of the vehicle is reduced. In some embodiments, the vehicle 1 is brought to standstill and warning indicators (or hazard lights) may be activated during the deceleration and kept on after the vehicle has stopped so to alert other road users. Furthermore, an automated procedure for contacting emergency services may be initiated by the vehicle 1. The vehicle 1 may be brought to standstill within the lane of travel 51, in an adjacent lane 52, or at a road shoulder 53 adjacent to the lane of travel 51.

Turning to FIG. 2, in some embodiments, the method S100 comprises monitoring S101 interventions performed by the LSS and monitoring S102 a state of the driver. In response to an LSS intervention being detected while the state of the driver is determined as a "driver-in-the-loop" state (e.g. "hands-on" state), a fourth counter (Cn) is increased S124 by one. Further, the method S100 may comprise removing S127 any entries in the fourth counter (Cn) that are older than the fourth time period (T4), and a check may be performed to see if the value of the fourth counter (Cn) is greater than the fourth threshold (N). If the fourth time period (T4) is e.g. Tx seconds, the step of removing S127 any entries comprises removing any entries in the fourth counter (Cn) that are older than Tx seconds. Further, in response to the fourth counter value (Cn) being greater than the fourth threshold (N), the method S100 may comprise starting S128 or restarting S128 a timer (tx).

Further, in response to an LSS intervention being detected/performed, while the driver is "out-of-the-loop", a check may be performed to see if the timer (tx) is within the range of 0 to T3, and if this is true, a third counter (Cm) may be increased S129 by one. Further, in response to the third counter value (Cm) being greater than the third threshold (M), the method S100 may comprise reducing S103 a speed of the vehicle.

As before, the method S100 may further comprise outputting S106 a warning to the driver of the vehicle, via an HMI of the vehicle, in response to an LSS intervention being performed. The third time period (T3) may be a value within the range of 10 to 600 seconds, such as e.g. 30 seconds, 60 seconds, 90 seconds, 120 seconds, 240 seconds, 300 seconds, and so forth. The fourth time period (T4) may be a value within the range of 10 to 600 seconds, such as e.g. 30 seconds, 60 seconds, 90 seconds, 120 seconds, and so forth. The third threshold value (M) may be a positive integer in the range of 1-5, such as e.g. 2, 3, or 4. The fourth threshold value (M) may be a positive integer in the range of 2-10, such as e.g. 3, 5, 7 or 8. As readily understood by the skilled artisan, the above-examples are not to be construed as limiting to the present disclosure, and the values T3, T4, M, and N may be set according to a predefined standard or a predefined regulation as defined by a governing authority. The governing authority may be an authority tasked with defining safety regulations for ADS functions or features.

In some embodiments, the third threshold (M) is smaller than the fourth threshold (N). Moreover, in some embodiments, the third time period (T3) is shorter than the fourth time period (T4). As before, LSS interventions performed while the driver is "out-of-the-loop" may be more critical than LSS interventions performed while the driver is "in-the-loop". Thus, a scenario where a number of "driver-in-the-loop" LSS interventions are immediately followed by one or more "driver-out-of-the-loop" LSS interventions may be indicative of that the driver is incapacitated (e.g. passed out) wherefore a faster trigger to bring the vehicle to a "safe state" (e.g. standstill) may be beneficial. In particular, such a scenario may indicate that the driver is struggling with controlling the vehicle, but still conscious, resulting in a number of "driver-in-the-loop" LSS interventions. However, once a "driver-out-of-the-loop" LSS intervention is detected immediately following the "driver-in-the-loop" LSS interventions, it may be an indication that the driver is experiencing a critical condition, and that the vehicle should be brought to a "safe state" (e.g. standstill) in order to reduce any risks to the occupants of the vehicle as well as to other road users.

Figure 8:
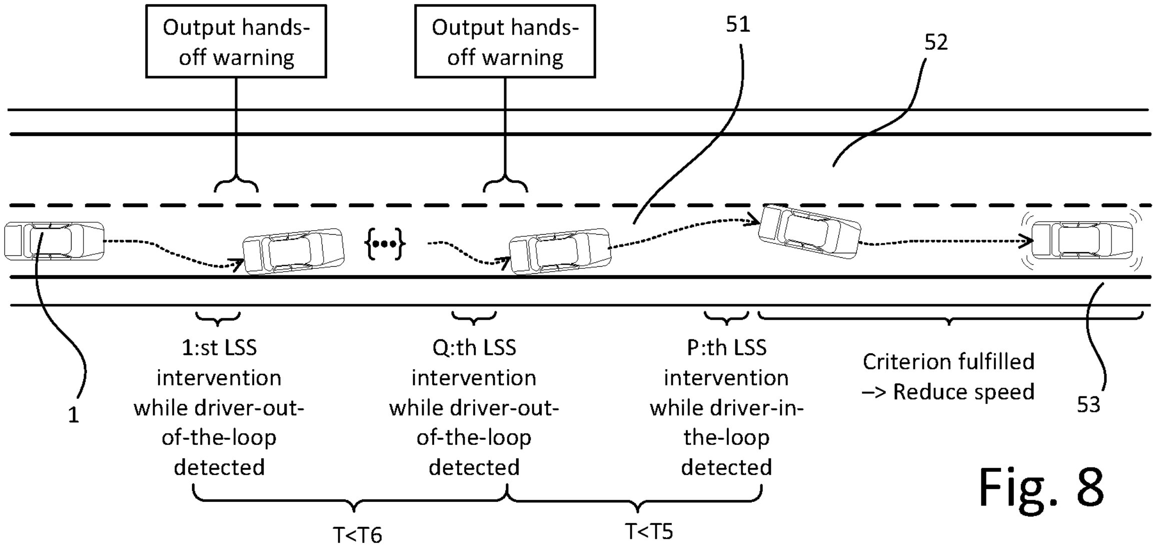

Further, in some embodiments, one criterion out of the plurality of criteria comprises that a number of interventions performed by the LSS, while the driver-in-the-loop state is detected, exceeds a fifth threshold (P) within a fifth time period (T5). Here, the fifth time period (T5) immediately follows an exceedance of a sixth threshold (Q) of a number of interventions performed by the LSS, while the driver-out-of-the-loop state is detected, within a sixth time period (T6). As illustrated in FIG. 8, the LSS performs Q interventions while the driver is determined to be "out-of-the-loop" (e.g. the driver is not touching the steering wheel) during a sixth time period (T6). Then, after the Q:th "driver-out-of-the-loop" intervention, the LSS performs P consecutive interventions while the driver is determined to be "in-the-loop" (e.g. touching the steering wheel) over the course of a fifth time period, which fulfils the criterion and the speed of the vehicle is reduced. In some embodiments, the vehicle 1 is brought to standstill and warning indicators (or hazard lights) may be activated during the deceleration and kept on after the vehicle has stopped so to alert other road users. Furthermore, an automated procedure for contacting emergency services may be initiated by the vehicle 1. The vehicle 1 may be brought to standstill within the lane of travel 51, in an adjacent lane 52, or at a road shoulder 53 adjacent to the lane of travel 51.

Turning to FIG. 3, in some embodiments, the method S100 comprises monitoring S101 interventions performed by the LSS and monitoring S102 a state of the driver. In response to an LSS intervention being detected/performed while the state of the driver is determined as a "driver-out-of-the-loop" state, a sixth counter (Cq) is increased S131 by one. Further, the method S100 may comprise removing S132 any entries in the sixth counter (Cq) that are older than the sixth time period (T6), and a check may be performed to see if the value of the sixth counter (Cq) is greater than the sixth threshold (Q). If the sixth time period (T6) is e.g. Tx seconds, the step of removing S132 any entries comprises removing any entries in the sixth counter (Cq) that are older than Tx seconds. Further, in response to the sixth counter value (Cq) being greater than a sixth threshold Q, the method S100 may comprise starting S133 or restarting S133 a timer (ty).

Further, in response to an LSS intervention being detected/performed, while the driver is "in-the-loop", a check may be performed to see if the timer (ty) is within the range of 0 to T5, and if this is true, a fifth counter (Cp) may be increased S134 by one. Further, in response to the fifth counter value (Cp) being greater than the fifth threshold (P), the method S100 may comprise reducing S103 a speed of the vehicle.

As before, the method S100 may further comprise outputting S106 a warning to the driver of the vehicle, via an HMI of the vehicle, in response to an LSS intervention being performed. The fifth time period (T5) may be a value within the range of 10 to 600 seconds, such as e.g. 30 seconds, 60 seconds, 90 seconds, 120 seconds, 240 seconds, 300 seconds, and so forth. The sixth time period (T6) may be a value within the range of 10 to 600 seconds, such as e.g. 30 seconds, 60 seconds, 90 seconds, 120 seconds, 240 seconds, 300 seconds, and so forth. The fifth threshold value (P) may be a positive integer in the range of 1-5, such as e.g. 2, 3, or 4. The sixth threshold value (Q) may be a positive integer in the range of 2-10, such as e.g. 3, 5, 7 or 8. As readily understood by the skilled artisan, the above-examples are not to be construed as limiting to the present disclosure, and the values T5, T6, P, and Q may be set according to a predefined standard or a predefined regulation as defined by a governing authority. The governing authority may be an authority tasked with defining safety regulations for ADS functions or features.

In some embodiments, the fifth threshold (P) is smaller than the sixth threshold (Q). Moreover, in some embodiments, the fifth time period (T5) is shorter than the sixth time period (T6). This example embodiment depicted in FIG. 3 and FIG. 8 may be understood as an opposite scenario compared to the one discussed in the foregoing with respect to FIG. 7 in conjunction with FIG. 2. Accordingly, the criterion or trigger depicted in FIG. 3 and FIG. 8 may catch scenarios where the driver has fallen out-of-the-loop and may be incapacitated (e.g. passed out) but manages to "wake up" before another LSS intervention is performed while the driver is out-of-the-loop". Therefore, the criterion or trigger depicted in FIG. 6 may not have been fulfilled. However, when waking up the driver may be disoriented and have poor control of the vehicle, wherefore the LSS may be forced to intervene again. This fulfils the criterion illustrated in FIGS. 3 and 8, and the vehicle may be brought to a "safe state" (e.g. standstill) in order to reduce any risks to the occupants of the vehicle as well as to other road users.

Figure 9:
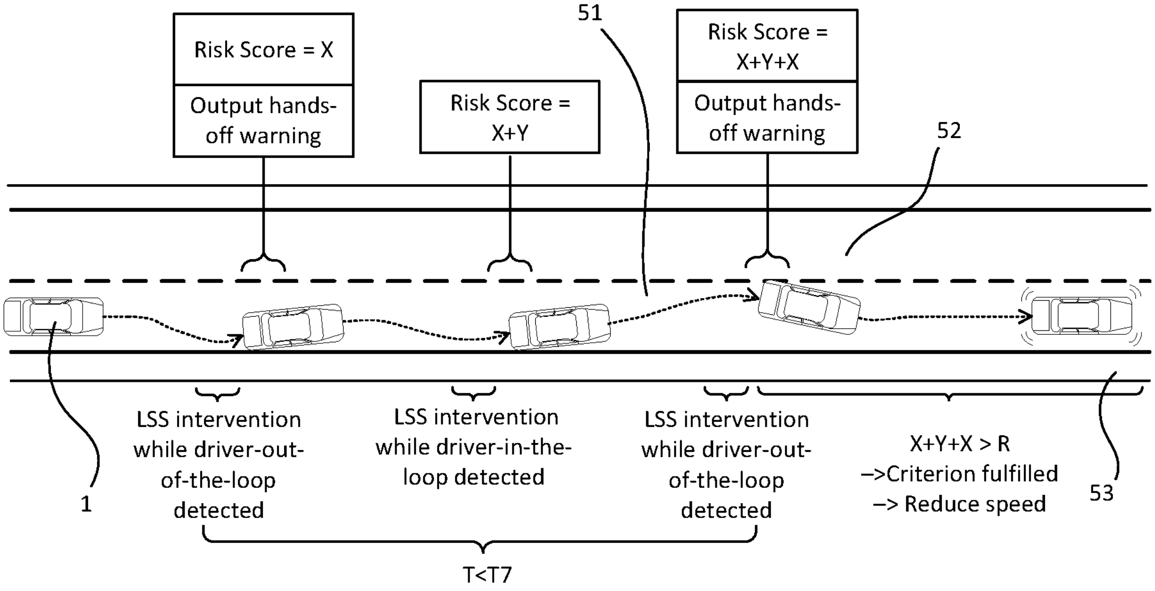

Further, in some embodiments, one criterion out of the plurality of criteria comprises that a weighted risk score exceeds a seventh threshold (R). The weighted risk score is determined based on a number of interventions performed by the LSS, while the driver-out-of-the-loop state is detected, and a number of interventions performed by the LSS, while the driver-in-the-loop state is detected, during a seventh time period (T7). As illustrated in FIG. 9, the LSS performs a first intervention while the driver is determined to be "out-of-the-loop", another intervention while the driver is determined to be "in-the-loop", and yet another intervention while the driver is determined to be "out-of-the-loop", during a seventh time period (T7). For each LSS intervention a Risk Score is increased by a first value X or a second value Y depending on if the intervention was performed while the driver was "out-of-the-loop" or "in-the-loop", respectively. In some embodiments the first value X is higher than the second value Y as LSS interventions performed while the driver is "out-of-the-loop" may be considered more critical than LSS interventions performed while the driver is "in-the-loop". Then, in response to the weighted risk score exceeding the seventh threshold (R) within the seventh time period (T7), the speed of the vehicle 1 is reduced. In some embodiments, the vehicle 1 is brought to standstill and warning indicators (or hazard lights) may be activated during the deceleration and kept on after the vehicle has stopped so to alert other road users. Furthermore, an automated procedure for contacting emergency services may be initiated by the vehicle 1. The vehicle 1 may be brought to standstill within the lane of travel 51, in an adjacent lane 52, or at a road shoulder 53 adjacent to the lane of travel 51.

Turning to FIG. 4, in some embodiments, the method S100 comprises monitoring S101 interventions performed by the LSS and monitoring S102 a state of the driver. In response to the state of the driver being a "driver-out-of-the-loop" state (e.g. a "hands-off" state), a "hands-off" warning may be output S121 via an HMI of the vehicle. Further, if an LSS intervention is detected, while the driver is "out-of-the-loop" a weighted risk score is increased S141 by a first number (X). However, if an LSS intervention is detected, while the driver is "in-the-loop" a weighted risk score is increased S142 by a second number (Y). In each case, after every increase of the weighted risk score entries in the weight risk score that are older than the seventh time period (T7) are removed S143. If the seventh time period (T7) is e.g. Tx seconds, the step of removing S143 any entries comprises removing any entries from the weighted risk score that are older than Tx seconds. Further, in response to the weighted risk score being greater than the seventh threshold (R), the method S100 may comprise reducing S103 a speed of the vehicle.

As before, the method S100 may further comprise outputting S106 a warning to the driver of the vehicle, via an HMI of the vehicle, in response to an LSS intervention being performed. The seventh time period (T7) may be a value within the range of 10 to 600 seconds, such as e.g. 30 seconds, 60 seconds, 90 seconds, 120 seconds, and so forth. The seventh threshold value (R) may be any suitable value depending on the choice of the first number (X) and the second number (Y). For example, in some embodiments, the first number is 1 and the second number is 0.5 and the seventh threshold value (R) may be any integer in the range of 2-10, such as e.g. 3, 5, 7, or 8. Moreover, in some embodiments, the value that is added to the weighted risk score may have a temporal dependency such that an LSS intervention that happens shortly after a preceding LSS intervention may be assigned a higher value that is added to the weighted risk score. As readily understood by the skilled artisan, the above-examples are not to be construed as limiting to the present disclosure, and the values X, Y, R and T7 may be set according to a predefined standard or a predefined regulation as defined by a governing authority. The governing authority may be an authority tasked with defining safety regulations for ADS functions or features.

As readily understood by the skilled reader, the different criteria of the plurality of criteria described in the foregoing may be implemented alone or in combination with one or more of the other criteria. Stated differently, the method S100 may comprise one or more of the criteria described in the foregoing with reference to FIGS. 2-9, while the trigger to reduce S103 the speed of the vehicle is caused by the fulfilment of a single criterion of the plurality of criteria.

Executable instructions for performing these steps and/or functions are, optionally, included in a non-transitory computer-readable storage medium or other computer program product configured for execution by one or more processors.

Figure 10:
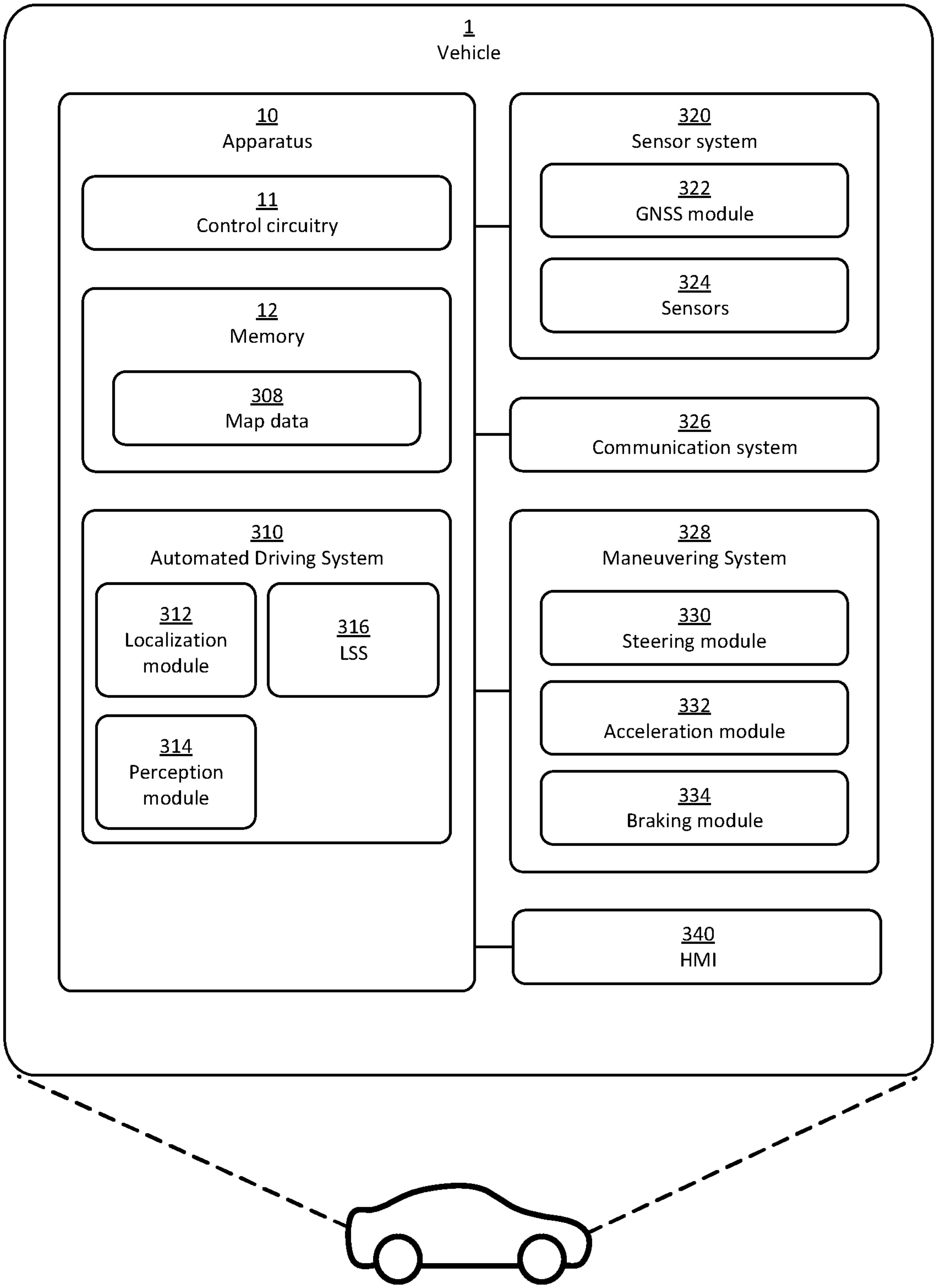
FIG. 10 is a schematic block diagram representation of a vehicle comprising an apparatus in accordance with some embodiments.

FIG. 10 is a schematic illustration of a vehicle 1 comprising such an apparatus 10 for controlling a vehicle 1 having an LSS 316 in accordance with some embodiments. As used herein, a "vehicle" is any form of motorized transport. For example, the vehicle 1 may be any road vehicle such as a car (as illustrated herein), a motorcycle, a (cargo) truck, a bus, etc.

The apparatus 10 comprises control circuitry 11 and a memory 12. The control circuitry 11 may physically comprise one single circuitry device. Alternatively, the control circuitry 11 may be distributed over several circuitry devices. As an example, the apparatus 10 may share its control circuitry 11 with other parts of the vehicle 1 (e.g. the ADS 310). Moreover, the apparatus 10 may form a part of the ADS 310, i.e. the apparatus 10 may be implemented as a module or feature of the ADS. The apparatus 10 may be a part of the LSS 316, i.e. the apparatus 10 may be implemented as a module or feature of the LSS 316. The control circuitry 11 may comprise one or more processors, such as a central processing unit (CPU), microcontroller, or microprocessor. The one or more processors may be configured to execute program code stored in the memory 12, in order to carry out various functions and operations of the vehicle 1 in addition to the methods disclosed herein. The processor(s) may be or include any number of hardware components for conducting data or signal processing or for executing computer code stored in the memory 12. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The memory 12 may include database components, object code components, script components, or any other type of information structure for supporting the various activities of the present description.

In the illustrated example, the memory 12 further stores map data 308. The map data 308 may for instance be used by the ADS 310 of the vehicle 1 in order to perform autonomous functions of the vehicle 1. The map data 308 may comprise high-definition (HD) map data. It is contemplated that the memory 12, even though illustrated as a separate element from the ADS 310, may be provided as an integral element of the ADS 310. In other words, according to an exemplary embodiment, any distributed or local memory device may be utilized in the realization of the present inventive concept. Similarly, the control circuitry 11 may be distributed e.g. such that one or more processors of the control circuitry 11 is provided as integral elements of the ADS 310 or any other system of the vehicle 1. In other words, according to some embodiments, any distributed or local control circuitry device may be utilized in the realization of the embodiments disclosed herein. The ADS 310 is configured carry out the functions and operations of the autonomous or semi-autonomous functions of the vehicle 1. The ADS 310 can comprise a number of modules, where each module is tasked with different functions of the ADS 310.

The vehicle 1 comprises a number of elements which can be commonly found in autonomous or semi-autonomous vehicles. It will be understood that the vehicle 1 can have any combination of the various elements shown in FIG. 10. Moreover, the vehicle 1 may comprise further elements than those shown in FIG. 10. While the various elements is herein shown as located inside the vehicle 1, one or more of the elements can be located externally to the vehicle 1. For example, the map data may be stored in a remote server and accessed by the various components of the vehicle 1 via the communication system 326. Further, even though the various elements are herein depicted in a certain arrangement, the various elements may also be implemented in different arrangements, as readily understood by the skilled person. It should be further noted that the various elements may be communicatively connected to each other in any suitable way. The vehicle 1 of FIG. 10 should be seen merely as an illustrative example, as the elements of the vehicle 1 can be realized in several different ways.

The vehicle 1 further comprises a sensor system 320. The sensor system 320 is configured to acquire sensory data about the vehicle itself, or of its surroundings. The sensor system 320 may for example comprise a Global Navigation Satellite System (GNSS) module 322 (such as a GPS) configured to collect geographical position data of the vehicle 1. The sensor system 320 may further comprise one or more sensors 324. The sensor(s) 324 may be any type of on-board sensors, such as cameras, LIDARs and RADARs, ultrasonic sensors, gyroscopes, accelerometers, odometers etc. It should be appreciated that the sensor system 320 may also provide the possibility to acquire sensory data directly or via dedicated sensor control circuitry in the vehicle 1. In particular, the sensor(s) 324 may be configured to acquire data (e.g. images) indicative a spatial location of one or more lane boundaries with respect to the vehicle 1.

The vehicle 1 further comprises a communication system 326. The communication system 326 is configured to communicate with external units, such as other vehicles (i.e. via vehicle-to-vehicle (V2V) communication protocols), remote servers (e.g. cloud servers), databases or other external devices, i.e. vehicle-to-infrastructure (V2I) or vehicle-to-everything (V2X) communication protocols. The communication system 318 may communicate using one or more communication technologies. The communication system 318 may comprise one or more antennas (not shown). Cellular communication technologies may be used for long range communication such as to remote servers or cloud computing systems. In addition, if the cellular communication technology used have low latency, it may also be used for V2V, V2I or V2X communication. Examples of cellular radio technologies are GSM, GPRS, EDGE, LTE, 5G, 5G NR, and so on, also including future cellular solutions. However, in some solutions mid to short range communication technologies may be used such as Wireless Local Area (LAN), e.g. IEEE 802.11 based solutions, for communicating with other vehicles in the vicinity of the vehicle 1 or with local infrastructure elements. ETSI is working on cellular standards for vehicle communication and for instance 5G is considered as a suitable solution due to the low latency and efficient handling of high bandwidths and communication channels.

The communication system 326 may accordingly provide the possibility to send output to a remote location (e.g. remote operator or control center) and/or to receive input from a remote location by means of the one or more antennas. Moreover, the communication system 326 may be further configured to allow the various elements of the vehicle 1 to communicate with each other. As an example, the communication system may provide a local network setup, such as CAN bus, I2C, Ethernet, optical fibers, and so on. Local communication within the vehicle may also be of a wireless type with protocols such as WiFi, LoRa, Zigbee, Bluetooth, or similar mid/short range technologies.

The vehicle 1 further comprises a maneuvering system 320. The maneuvering system 328 is configured to control the maneuvering of the vehicle 1. The maneuvering system 328 comprises a steering module 330 configured to control the heading of the vehicle 1. The maneuvering system 328 further comprises a acceleration module 332 configured to control actuation of an accelerator of the vehicle 1. The maneuvering system 328 further comprises a braking module 334 configured to control actuation of the brakes of the vehicle 1. The various modules of the maneuvering system 328 may also receive manual input from a driver of the vehicle 1 (i.e. from a steering wheel, an accelerator pedal and a brake pedal respectively). However, the maneuvering system 328 may be communicatively connected to the ADS 310 of the vehicle, to receive instructions on how the various modules of the maneuvering system 328 should act. Thus, the ADS 310 can control the maneuvering of the vehicle 1, for example via the decision and control module 318.

The ADS 310 may comprise a localization module 312 or localization block/system. The localization module 312 is configured to determine and/or monitor a geographical position and heading of the vehicle 1, and may utilize data from the sensor system 320, such as data from the GNSS module 322. Alternatively, or in combination, the localization module 312 may utilize data from the one or more sensors 324. The localization system and/or the GNSS module 322 may alternatively be realized as a Real Time Kinematics (RTK) GPS in order to improve accuracy.

The ADS 310 may further comprise a perception module 314 or perception block/system 314. The perception module 314 may refer to any commonly known module and/or functionality, e.g. comprised in one or more electronic control modules and/or nodes of the vehicle 1, adapted and/or configured to interpret sensory data-relevant for driving of the vehicle 1—to identify e.g. obstacles, vehicle lanes, relevant signage, appropriate navigation paths etc. The perception module 314 may thus be adapted to rely on and obtain inputs from multiple data sources, such as automotive imaging, image processing, computer vision, and/or in-car networking, etc., in combination with sensory data e.g. from the sensor system 320. In particular, the perception module 314 may be configured to track lane boundaries with respect to the vehicle 1 and to output this information to the LSS 316 of the vehicle 1.

The localization module 312 and/or the perception module 314 may be communicatively connected to the sensor system 320 in order to receive sensory data from the sensor system 320. The localization module 312 and/or the perception module 314 may further transmit control instructions to the sensor system 320.

The apparatus 10 comprises control circuitry in communicative connection with the LSS 316. The control circuitry is configured to monitor interventions performed by the LSS 316. The control circuitry 11 is further configured to reduce a speed of the vehicle 1 in response to a fulfilment of a criterion dependent on a number of interventions performed by the LSS exceeding a threshold value within a defined time period. The control circuitry 11 may be configured to reduce the speed of the vehicle 1 by outputting a control signal to the braking module 324. In some embodiments, the control circuitry 11 is configured to reduce the speed of the vehicle to zero.

Furthermore, in some embodiments, the control circuitry 11 is configured to monitor a state of a driver of the vehicle, the state of the driver comprising a driver-in-the-loop state and a driver-out-of-the-loop state. In some embodiments, the control circuitry 11 is configured to output one or more warnings to the driver, via one or more HMIs 340 of the vehicle 1, in response to a detection of the state of the driver being the driver-out-of-the-loop state.

In some embodiments, the control circuitry 11 is configured to steer the vehicle to a center of the lane of travel in response to the fulfilment of the criterion. The control circuitry 11 may for example be configured to output a control signal to a steering module 330 of the vehicle 1 in order to steer the vehicle to the center of the lane of travel.

In some embodiments, the control circuitry 11 is configured to steer the vehicle to a road shoulder adjacent to the lane of travel or a lane adjacent to the lane of travel in response to the fulfilment of the criterion. The control circuitry 11 may for example be configured to output a control signal to a steering module 330 of the vehicle 1 in order to steer the vehicle to a road shoulder adjacent to the lane of travel or a lane adjacent to the lane of travel.

In some embodiments, the control circuitry 11 is configured to turn on warning indicators of the vehicle 1 in response to the fulfilment of the criterion. Furthermore, the control circuitry 11 may be configured to output one or more warnings to the driver, via one or more HMIs of the vehicle 1, in response to an intervention being performed by the LSS 316.

The present technology has been presented above with reference to specific embodiments. However, other embodiments than the above described are possible and within the scope of the disclosure. Different method steps than those described above, performing the method by hardware or software, may be provided within the scope of the claims. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the apparatus 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of monitoring a state of the driver and monitoring interventions performed by the LSS may be interchanged based on a specific realization. Such variation will depend on the software and hardware systems chosen and on designer choice. All such variations are within the scope of the claims. Likewise, software implementations could be accomplished with standard programming techniques with rule-based logic and other logic to accomplish the various monitoring, outputting, reducing, increasing, removing, bringing steps. The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A computer-implemented method for controlling a vehicle having a Lane Support System (LSS) configured to automatically intervene by controlling a steering of the vehicle in order to change a heading direction of the vehicle when the vehicle approaches a lane boundary of a lane of travel so that the vehicle does not traverse the lane boundary, the method comprising:

monitoring interventions performed by the LSS;

monitoring a state of a driver of the vehicle, the state of the driver comprising a driver-in-the-loop state and a driver-out-of-the-loop state;

in response to a fulfilment of a criterion dependent on a number of interventions performed by the LSS exceeding a threshold value within a defined time period:

reducing a speed of the vehicle, wherein the criterion comprises:

that a number of interventions performed by the LSS, while the driver-out-of-the-loop state is detected, exceeds a first threshold (M) within a first time period (T3), wherein the first time period (T3) immediately follows an exceedance of a second threshold (N) of a number of interventions performed by the LSS, while the driver-in-the-loop state is detected, within a second time period (T4), that a number of interventions performed by the LSS, while the driver-in-the-loop state is detected, exceeds a third threshold (P) within a third time period (T5), wherein the third time period (T5) immediately follows an exceedance of a fourth threshold (Q) of a number of interventions performed by the LSS, while the driver-out-of-the-loop state is detected, within a fourth time period (T6), or that a weighted risk score exceeds a fifth threshold (R), wherein the weighted risk score is determined based on a number of interventions performed by the LSS, while the driver-out-of-the-loop state is detected, and a number of interventions performed by the LSS, while the driver-in-the-loop state is detected, during a fifth time period (T7).

2. The method according to claim 1, wherein the driver-in-the-loop state comprises a state where the driver is touching a steering wheel of the vehicle and/or where the driver applies a torque on the steering wheel of the vehicle; and wherein the driver-out-of-the-loop state is a state where the driver is not touching the steering wheel of the vehicle and/or where the driver is not applying any torque on the steering wheel of the vehicle.

3. The method according to claim 1, further comprising:

outputting one or more warnings to the driver, via one or more Human-Machine-Interfaces (HMIs) of the vehicle, in response to a detection of the state of the driver being the driver-out-of-the-loop state.

4. The method according to claim 1, wherein reducing the speed of the vehicle comprises reducing the speed of the vehicle to zero.

5. The method according to claim 1, further comprising steering the vehicle to a centre of the lane of travel, steering the vehicle to a road shoulder adjacent to the lane of travel, or steering the vehicle to a lane adjacent to the lane of travel in response to the fulfilment of the criterion.

6. The method according to claim 1, further comprising turning on warning indicators of the vehicle in response to the fulfilment of the criterion.

7. The method according to claim 1, further comprising outputting one or more warnings to the driver, via one or more Human-Machine-Interfaces (HMIs) of the vehicle, in response to an intervention being performed by the LSS.

8. The method according to claim 1, wherein the LSS is configured to automatically intervene by applying an overlay steer torque to a steering system of the vehicle when the vehicle approaches the lane boundary of the lane of travel so that the vehicle does not traverse the lane boundary.

9. A non-transitory computer-readable storage medium comprising instructions which, when executed by a computing device of a vehicle, causes the computing device to carry out the method according to claim 1.

10. An apparatus for controlling a vehicle having a Lane Support System (LSS) configured to automatically intervene by controlling a steering of the vehicle in order to change a heading direction of the vehicle when the vehicle approaches a lane boundary of a lane of travel so that the vehicle does not traverse the lane boundary, the apparatus comprising control circuitry in communicative connection with the LSS, the control circuitry being configured to:

monitor interventions performed by the LSS;

monitor a state of a driver of the vehicle, the state of the driver comprising a driver-in-the-loop state and a driver-out-of-the-loop state;

in response to a fulfilment of a criterion dependent on a number of interventions performed by the LSS exceeding a threshold value within a defined time period:

reduce a speed of the vehicle, wherein the criterion comprises:

that a number of interventions performed by the LSS, while the driver-out-of-the-loop state is detected, exceeds a first threshold (M) within a first time period (T3), wherein the first time period (T3) immediately follows an exceedance of a second threshold (N) of a number of interventions performed by the LSS, while the driver-in-the-loop state is detected, within a second time period (T4), that a number of interventions performed by the LSS, while the driver-in-the-loop state is detected, exceeds a third threshold (P) within a third time period (T5), wherein the third time period (T5) immediately follows an exceedance of a fourth threshold (Q) of a number of interventions performed by the LSS, while the driver-out-of-the-loop state is detected, within a fourth time period (T6), or that a weighted risk score exceeds a fifth threshold (R), wherein the weighted risk score is determined based on a number of interventions performed by the LSS, while the driver-out-of-the-loop state is detected, and a number of interventions performed by the LSS, while the driver-in-the-loop state is detected, during a fifth time period (T7).

11. The apparatus according to claim 10, wherein the control circuitry is configured to reduce the speed of the vehicle to zero.

12. A vehicle comprising:

a Lane Support System (LSS) configured to automatically intervene by controlling a steering of the vehicle in order to change a heading direction of the vehicle when the vehicle approaches a lane boundary of a lane of travel so that the vehicle does not traverse the lane boundary; and an apparatus according to claim 11.

* * * * *